(12) United States Patent
Raghunandan

(10) Patent No.: US 7,231,434 B2
(45) Date of Patent: *Jun. 12, 2007

(54) METHOD, APPARATUS AND COMPUTER PROGRAM PRODUCT TO CHECK E-MAIL COUNT AT BOOT TIME IN COMPUTING SYSTEMS

(75) Inventor: Hulikunta Prahlad Raghunandan, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/204,476

(22) Filed: Aug. 16, 2005

(65) Prior Publication Data

US 2006/0031667 A1 Feb. 9, 2006

(51) Int. Cl.
*G06F 15/177* (2006.01)
(52) U.S. Cl. ............... 709/220; 709/222; 709/206; 713/2
(58) Field of Classification Search ............. 709/220, 709/222–224, 206; 713/1, 2, 100
See application file for complete search history.

(56) References Cited

U.S. PATENT DOCUMENTS

| | | | | |
|---|---|---|---|---|
| 5,680,547 A | * | 10/1997 | Chang | 709/222 |
| 5,978,912 A | * | 11/1999 | Rakavy et al. | 713/2 |
| 6,009,520 A | * | 12/1999 | Gharda | 713/1 |
| 6,178,503 B1 | * | 1/2001 | Madden et al. | 713/2 |
| 6,272,629 B1 | * | 8/2001 | Stewart | 713/2 |
| 6,438,688 B1 | * | 8/2002 | Nunn | 713/2 |
| 6,457,879 B1 | * | 10/2002 | Thurlow et al. | 709/206 |
| 6,463,530 B1 | * | 10/2002 | Sposato | 713/2 |
| 6,564,318 B1 | * | 5/2003 | Gharda et al. | 713/2 |
| 6,609,151 B1 | * | 8/2003 | Khanna et al. | 709/222 |
| 6,889,251 B1 | * | 5/2005 | Zhang | 709/220 |
| 6,952,725 B1 | * | 10/2005 | Raghunandan | 709/220 |

* cited by examiner

*Primary Examiner*—Philip B. Tran
(74) *Attorney, Agent, or Firm*—Anthony V. S. England; William Steinberg

(57) ABSTRACT

A computing system connected to a remote e-mail server through a network and a network adapter includes a basic input/output system ("BIOS"). The computing system accesses e-mail information by the BIOS accessing the remote e-mail server through the network during the booting of the computing system using the network adapter and downloading, during the booting of the computing system, e-mail headers from the remote e-mail server on the network. The BIOS parses the e-mail headers during the booting of the computing system and extracts an e-mail count for a user. The BIOS displays the e-mail count for the user in a defined format during the booting of the computing system.

20 Claims, 2 Drawing Sheets

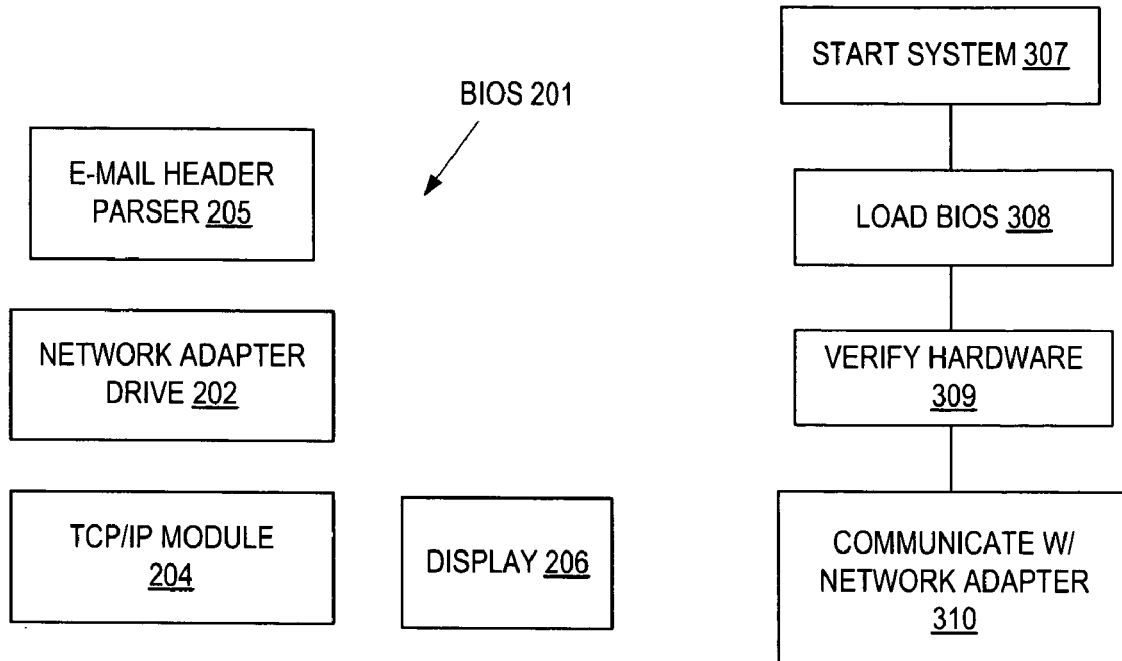
FIGURE 2
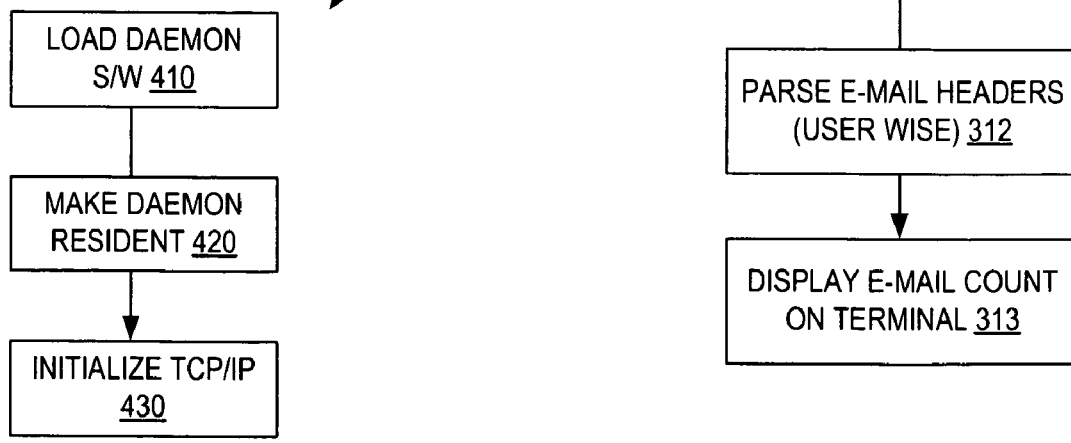
FIGURE 4
FIGURE 3

METHOD, APPARATUS AND COMPUTER PROGRAM PRODUCT TO CHECK E-MAIL COUNT AT BOOT TIME IN COMPUTING SYSTEMS

BACKGROUND OF THE INVENTION

1. Field of the Invention

This invention relates to checking e-mail information during computing system booting.

2. Related Art

A basic input/output system ("BIOS") is a program, usually stored in an erasable programmable read only memory ("EPROM") in the hardware of a computer system, that carries out a sequence of operations (referred to herein as "booting") for starting up the computer system when the system is switched on. BIOS is an integral part of a personal computing system and typically comes installed on the system. In contrast, an operating system ("OS") is typically either preinstalled by the manufacturer or vendor, or installed by a user. Booting, which is under control of the BIOS, includes determining a configuration for the computer system, verifying some of the hardware, and loading at least an OS loader, if not the whole OS itself, into the computing system's random access memory ("RAM") from a storage device, such as a hard disk.

The BIOS frees up the OS and its applications from having to understand exact details such as hardware addresses about attached input/output devices. When device details change, only the BIOS program needs to be changed. Sometimes this change can be made during system setup. In any case, neither the OS nor applications used need to be changed if BIOS keeps track of changes in attached device details. The BIOS may also manage initial data flow between the computing system's OS and certain attached devices such as a hard disk, video adapter, keyboard, mouse, and printer. In many systems, once the OS loader is loaded it takes over and controls loading of the OS.

A computer system is ready to perform useful tasks only after these basic activities of booting and loading the OS have been completed. Exchanging e-mail over a network is one such useful task that is extremely popular for computing systems.

Ethernet is a widely installed local area network ("LAN") technology and is specified by the Institute of Electrical and Electronics Engineers ("IEEE") 802.3 standard. In general, 802.3 specifies the physical media and the working characteristics of Ethernet. The original Ethernet supports a data rate of 10 megabits per second ("Mbps") and specifies numerous possible physical media. An Ethernet LAN typically uses coaxial cable or special grades of twisted pair wires. Ethernet is also used in wireless LANs. The most commonly installed Ethernet systems are called 10BASE-T and provide transmission speeds up to 10 Mbps. Devices are connected to the cable and compete for access using a Carrier Sense Multiple Access with Collision Detection ("CSMA/CD") protocol. Fast Ethernet or 100BASE-T provides transmission speeds up to 100 megabits per second and is typically used for LAN backbone systems, supporting workstations with 10BASE-T cards. Gigabit Ethernet provides an even higher level of backbone support at 1000 megabits per second (1 gigabit or 1 billion bits per second). 10-Gigabit Ethernet provides up to 10 billion bits per second.

Personal computing systems and workstations on a LAN typically contain a network interface card ("NIC"), also referred to herein as a network adapter, specifically designed for the LAN transmission technology, such as Ethernet or Token Ring. An NIC may provide a dedicated, full-time connection to a network. A wireless LAN is one in which a mobile user can connect to the LAN via a radio frequency signal. A standard, IEEE 802.11, specifies technologies for wireless LANs.

The Transmission Control Protocol/Internet Protocol ("TCP/IP") standard, also specified by IEEE 802.3, is commonly used for communication on such a network. TCP/IP is a basic communication language or protocol of the Internet. It can also be used as a communications protocol in a private network (either an intranet or an extranet). When set up with direct access to the Internet, a computing system is provided with a copy of the TCP/IP program. TCP/IP is a two-layer program. The higher layer, Transmission Control Protocol, manages the assembling of a message or file into smaller packets that are transmitted over the Internet and received by a TCP layer that reassembles the packets into the original message. The lower layer, Internet Protocol, handles the address part of each packet so that it gets to the right destination. Each gateway computing system on the network checks this address to see where to forward the message. Even though some packets from the same message are routed differently than others, they'll be reassembled at the destination.

TCP/IP uses the client/server model of communication in which a computing system user (a client) requests and is provided a service (such as sending a Web page) by another computing system (a server) in the network. TCP/IP communication is primarily point-to-point, meaning each communication is from one point (or host computing system) in the network to another point or host computing system. TCP/IP and the higher-level applications that use it are collectively said to be "stateless" because each client request is considered a new request unrelated to any previous one (unlike ordinary phone conversations that require a dedicated connection for the call duration). Being stateless frees network paths so that everyone can use them continuously. (Note that the TCP layer itself is not stateless as far as any one message is concerned. Its connection remains in place until all packets in a message have been received.)

Higher layer application protocols use TCP/IP to get to the Internet. These include the World Wide Web's Hypertext Transfer Protocol ("HTTP"), the File Transfer Protocol ("FTP"), Telnet which lets a user logon to remote computing systems, and the Simple Mail Transfer Protocol ("SMTP"). These and other protocols are often packaged together with TCP/IP as a "suite." Personal computing system users with an analog phone modem connection to the Internet usually get to the Internet through the Serial Line Internet Protocol ("SLIP") or the Point-to-Point Protocol ("PPP"). These protocols encapsulate the IP packets so that they can be sent over the dial-up phone connection to an access provider's modem. Other protocols related to TCP/IP include the User Datagram Protocol ("UDP"), which is used instead of TCP for special purposes. Other protocols are used by network host computing systems for exchanging router information. These include the Internet Control Message Protocol ("ICMP"), the Interior Gateway Protocol ("IGP"), the Exterior Gateway Protocol ("EGP"), and the Border Gateway Protocol ("BGP").

An e-mail communication protocol is often included with the TCP/IP suite of protocols. One such e-mail protocol for sending e-mail is Simple Mail Transfer Protocol, and a popular protocol for receiving e-mail is POP3. Both Netscape and Microsoft include an e-mail utility with their Web browsers.

Conventionally, e-mail tasks are performed by an e-mail application program that starts up after booting of a computer system. For a user interested primarily in merely knowing a received e-mail count, a significant amount of time may be spent waiting for the system to boot and then load the e-mail application. Many users, especially those traveling frequently, need to keep in constant touch with their incoming mail. This requires frequent accessing of the e-mail application on the computing system. Since a computing system has to be booted, and since in a typical mode of operating an e-mail application has to be loaded to check e-mail each time the computing system is turned on, the waiting time to get e-mail information such as the e-mail count becomes significant, particularly with increased frequency of e-mail checking.

SUMMARY OF THE INVENTION

An object of this invention is to reduce time required for a computing system to check e-mail information when the system is booted. According to one form of the invention, a computing system includes a processor, memory, a display, a network adapter for connecting the computing system to a network, and a basic input/output system ("BIOS") stored in the memory and operable for booting the computing system. The BIOS includes a BIOS network adapter driver for communicating with the network adapter. The BIOS also includes a BIOS communication module for driving the network adapter via the network adapter driver to communicate with a remote e-mail server on the network. The communication with the remote e-mail server includes downloading to the computer system memory, during the booting of the computing system, e-mail headers from the remote e-mail server on the network. The BIOS also includes a BIOS e-mail header parser for identifying a predetermined user address in To: portions of the e-mail herders and accumulating in the computer system memory, during the booting of the computing system, a count of instances of the identified user address. The BIOS also includes a BIOS display routine for displaying the accumulated count in a defined format on the display during the booting of the computing system.

According to another aspect of the invention, the computer system memory includes a volatile memory and a non-volatile memory, and the memory in which the BIOS is stored includes the non-volatile memory. The non-volatile memory includes a protocol module having code for a simple mail transfer protocol, a serial line Internet protocol and a point to point protocol. The BIOS is operable to load a daemon of the protocol module into the volatile memory during booting of the computing system without loading an operating system, so that the daemon is operable to access the network during the booting of the computing system.

In another aspect of the invention, the BIOS communication module includes code for a simple mail transfer protocol, a serial line Internet protocol and a point to point protocol.

In another aspect, in order to reduce the communication module size, the BIOS communication module does not include computer program code for a hypertext transfer protocol, a file transfer protocol, a user datagram protocol, an Internet control message protocol, an interior gateway protocol, an exterior gateway protocol, and a border gateway protocol.

In a still further aspect of the invention, the computer system includes a protocol module in one of the computer system memories, wherein the protocol module has a simple mail transfer protocol, a serial line Internet protocol and a point to point protocol, and wherein the BIOS communication module includes a link to the protocol module for loading the simple mail transfer protocol, serial line Internet protocol and point to point protocol during the booting of the computing system.

In yet another aspect, the BIOS network adapter driver does not include computer program code for an nslookup function and for a traceroute function.

In another form of the invention, a method for accessing e-mail information on a network includes communicating with a network adapter by a BIOS network adapter driver in a computing system. A BIOS communication module drives the network adapter driver, which, in turn, drives the network adapter for communicating with a remote e-mail server on the network. The communicating with the remote e-mail server includes downloading to memory of the computer system, during the booting of the computing system, e-mail headers from the remote e-mail server on the network. Instances of a predetermined user address are found in To: portions of the e-mail herders by an e-mail header parser of the BIOS during the booting of the computing system. Also during the booting of the computing system, a count of the instances is accumulated in the computer system memory, by the BIOS e-mail header parser. A display routine of the BIOS displays the accumulated count in a defined format on the display during the booting of the computing system.

In another aspect of the method form of the invention, the BIOS loads a daemon of the protocol module into the volatile memory without loading an operating system and the daemon accesses the network during the booting of the computing system.

In another aspect, the BIOS communication module drives the network adapter driver with a simple mail transfer protocol, a serial line Internet protocol and a point to point protocol.

In another aspect, the method form of the invention includes loading the simple mail transfer protocol, serial line Internet protocol and point to point protocol during the booting of the computing system by the BIOS using a link to the protocol module.

Other forms, variations, objects and advantages of the invention will become apparent upon reading the following detailed description and upon reference to the accompanying drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment read in conjunction with the accompanying drawings.

FIG. 2 illustrates details of the BIOS of FIG. 1, according to an embodiment of the present invention.

FIG. 3 shows a system activity flow chart, according to an embodiment of the present invention.

FIG. 4 shows a details of one of the processes of the system activity flow chart of FIG. 3, according to an embodiment of the present invention.

DETAILED DESCRIPTION OF A PREFERRED EMBODIMENT

Figure 1:
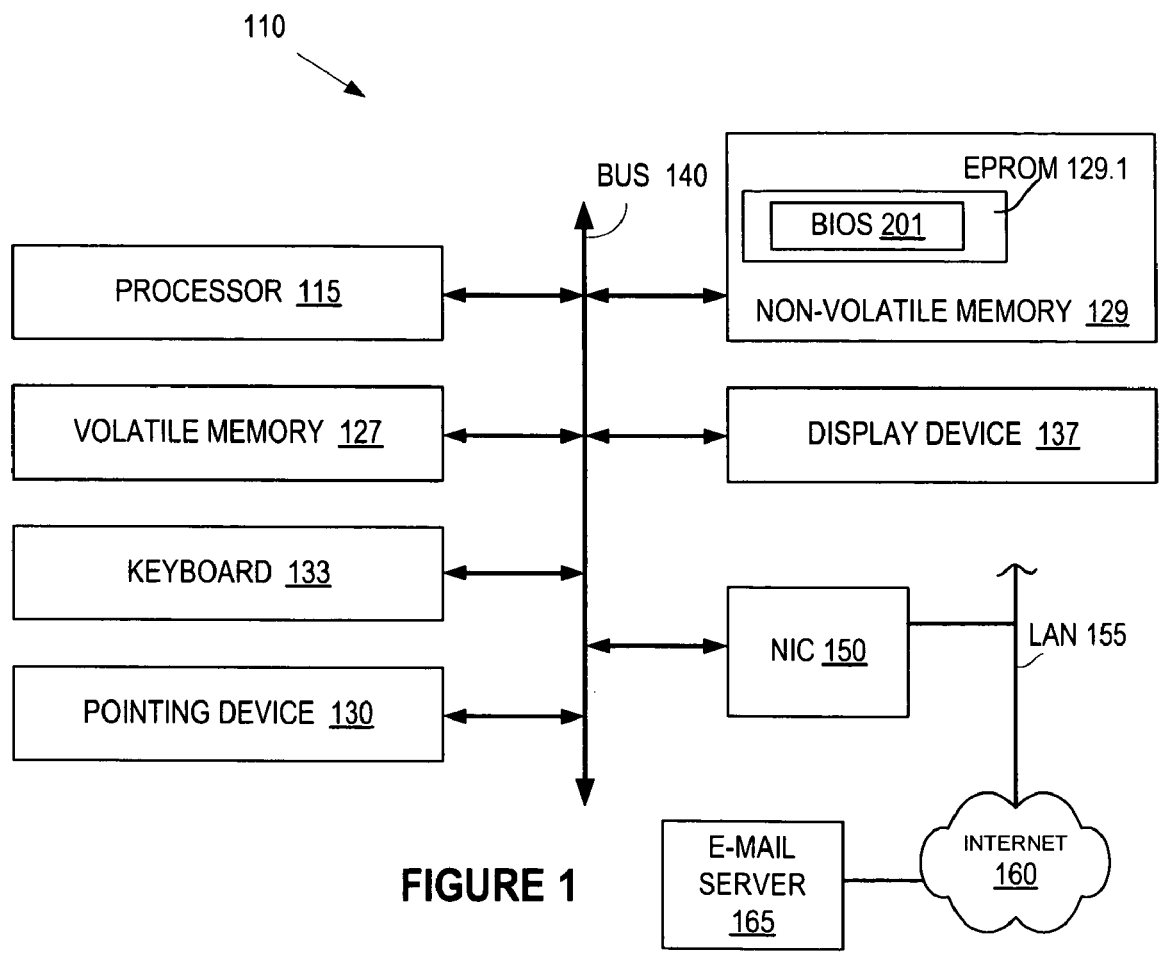
FIG. 1 illustrates a computing system having a certain BIOS, according to an embodiment of the present invention.

In the following detailed description of a preferred embodiment, reference is made to the accompanying drawings illustrating one or more embodiments in which the invention may be practiced. It should be understood that other embodiments may be utilized and changes may be made without departing from the scope of the present invention.

Referring to FIG. 1, a block diagram is shown illustrating a computing system 110, according to an embodiment of the present invention. In various embodiments, system 110 takes a variety of forms, including a personal computer system, mainframe computer system, workstation, server, etc. That is, it should be understood that the term "computing system" is intended to encompass any device having a processor that executes instructions from a memory medium.

System 110 includes a processor 115, a volatile memory 127, e.g., RAM, a keyboard 133, a pointing device 130, e.g., a mouse, a nonvolatile memory 129, e.g., ROM, hard disk, floppy disk, CD-ROM, and DVD, and a display device 137 having a display screen. Nonvolatile memory 129 includes an EPROM 129.1 having a novel BIOS 201, according to an embodiment of the present invention, which will be described further herein below. Volatile memory 127 has an OS (not shown).

Memory 127 and 129 store program instructions (also known as a "software program"), including BIOS 201 on EPROM 129.1 of nonvolatile memory 129. The software programs are executable by processor 115 to implement various embodiments of a method in accordance with the present invention. That is, various embodiments of the present invention implement processes described herein in one or more software programs in various ways, including procedure-based techniques, component-based techniques, and/or object-oriented techniques, among others. Specific examples include XML, C, C++ objects, Java and commercial class libraries.

Components included in system 110 are interconnected by bus 140. A circuit board or card NIC 150 of system 110 is connected to bus 140 and LAN 155 to enable information exchange between system 110 and LAN 155, which is connected to Internet 160 and an e-mail server 165. NIC 150 may, in one embodiment of the invention, have functionality for wired access to LAN 155. In another embodiment of the invention, NIC 150 have functionality for wireless access to LAN 155. In one embodiment of the present invention, NIC 150 adapts system 110 for an Ethernet LAN 155. In another, NIC 150 adapts system 110 for a token ring LAN 155. In still other embodiments of the invention NIC 150 adapts system 110 for other network technologies.

Referring now to FIG. 2, BIOS 201 of FIG. 1 is illustrated in more detail, according to an embodiment of the present invention. BIOS is typically an intermediary that controls information and data flow between a processor and I/O devices of a system. However, it is known for BIOS to arrange for data to flow directly to memory from devices such as video cards that require faster data flow to be effective. In the present embodiment of the invention, the BIOS implements a functionality of the OS that is limited, but sufficient to get the network up and running and to get certain e-mail information. More specifically, BIOS 201 contains a limited function network adapter driver 202, which contains operating routines for communicating with NIC 150 (FIG. 1). BIOS 201 also includes a limited function TCP/IP communication module 204, an e-mail header parser 205 and a limited function display routine 206. TCP/IP module 204 is operable as part of BIOS 201 so that TCP/IP module 204 loads during booting of the system 110 and drives the network adapter via the network adapter driver to communicate with remote e-mail server 165 on Internet 160, which includes downloading to computer system memory 127 or 129, during the booting of computing system 110, e-mail headers from remote e-mail server 165. To achieve this, aspects of a conventional TCP/IP module are ported to computing system 110 and included as limited function TCP/IP module 204 in BIOS 201.

With regard to the limited functionality of the portions of BIOS 201 shown in FIG. 2, it should be understood that system 110 may have all the functions of conventional TCP/IP, but parts of the conventional TCP/IP code are in code that is in addition to TCP/IP module 204. That is, in order to keep BIOS 201 small, and to keep boot time short, TCP/IP module 204 includes only a portion of conventional TCP/IP code. In one embodiment of the invention, TCP/IP module 204 does have code for Simple mail transfer protocol, Serial line Internet protocol and Point to Point protocol, but does not have code for Hypertext Transfer Protocol, File Transfer Protocol, User Datagram Protocol, Internet Control Message Protocol, Interior Gateway protocol, Exterior Gateway protocol, and Border Gateway Protocol.

TCP/IP module 204 is implemented for wireless network communication in one embodiment of the invention. In another embodiment of the invention, TCP/IP module 204 is implemented for wired network communication. According to other embodiments of the invention, other protocols like SMTP, PPP or SLIP are implemented for communication module 204 in BIOS 201 instead of, or in addition to, TCP/IP.

In a similar fashion as for TCP/IP module 204, system 110 may have all the remaining functions of a conventional network adapter driver in code that is in addition to limited function network adapter driver 202. That is, network adapter driver 202 includes only a portion of the conventional network adapter driver code. In particular, in one embodiment of the invention, network adapter driver 202 omits the nslookup and traceroute network functions omitted from limited function TCP/IP module 204. Likewise, display routine 206 includes only such portion of a conventional display driver as is needed to drive a simple presentation of the e-mail count obtained during booting.

In an alternative embodiment of the invention, some of the parts of the BIOS 201 shown in FIG. 2, such as TCP/IP module 204, for example, are not included in BIOS 201, but rather are closely linked thereto. For example, in one embodiment of the invention, for TCP/IP module 204, which as previously stated is a portion of a conventional TCP/IP suite in system 110, there is a link in BIOS 201 that enables BIOS 201 to load the limited functions of TCP/IP module 204 during boot and before BIOS 201 obtains an e-mail count. Then the rest of the conventional TCP/IP suite in system 110 is loaded later in the boot up process. Likewise, in one embodiment of the invention instead of literally including network adapter driver 202 in BIOS 201 there is a link in BIOS 201 that enables BIOS 201 to load the limited functions of network adapter driver 202 during boot and before BIOS 201 obtains an e-mail count. Then the rest of the conventional network adapter driver in system 110 is loaded later in the boot up process, after getting the e-mail count.

Referring to FIG. 3, when the computing system 110 (FIG. 1) is switched on 307, BIOS 201) (FIG. 1) is loaded 308 and starts execution. As a first step, BIOS 201 verifies 309 hardware of system 110. This includes initializing NIC 150 (FIG. 1) via driver 202 (FIG. 2). If verification and initialization 309 is successful, BIOS uses its driver 202 to communicate 310 with NIC 150. Further BIOS 201 uses its TCP/IP module 204 (FIG. 2) to communicate 311 via driver 202, NIC 150, and LAN 155 (FIG. 1) with remote e-mail server 165 (FIG. 1) over Internet 160 (FIG. 1), and thereby access e-mail headers of e-mail's on server 165. The received e-mail headers are then parsed 312 by e-mail header parser 205 of BIOS 201 to extract an e-mail count for designated users from the headers. This information is then displayed 313 by display routine 206 (FIG. 2) of BIOS 201 on display device 137 of the system, as will be described further herein below.

Referring now to FIG. 4, details of the verifying and initializing 309 of FIG. 3 are described, according to an embodiment of the invention in which limited function TCP/IP module 204 is not literally included in BIOS 201, but rather, as described above, is linked to BIOS 201 for loading before getting an e-mail count. As was described herein above, NIC 150 is initialized by driver 202 of BIOS 201 according to process 309, and then NIC 150 is accessed by driver 202 to reach Internet 160 and server 165. In an embodiment of the invention, only a reduced functionality of NIC 150 is initialized and used in this manner. That is, BIOS 201 verifies and initializes 309 NIC 150, as described herein above, to begin with the reduced functionality. In particular, this includes loading 410, into a portion of volatile memory 127 that is designated for loading BIOS 201, a TCP/IP daemon of TCP/IP module 204 that is stored in EPROM 429.1.

Next, the daemon is made resident 420. Normally, to start such a daemon the OS must be started, and the OS, in turn, starts the daemon. According to the embodiment of the present invention, however, BIOS 201 has a mini-OS that can start one or more daemons on its own. And these daemons are modified, according to the embodiment of the present invention, to interact with NIC 150 and access the network. Preferably their functionality is limited and only one daemon is started, so that including this functionality in BIOS 201 does not make BIOS 201 too large. (The size of BIOS 201 is of concern, since BIOS 201 is stored in EPROM 129.1, which tends to have significant size and cost constraints.)

Next, the TCP/IP module 204 is initialized 430, i.e., control is passed to TCP/IP module 204.

Referring again to FIG. 2, e-mail header parser 205 parses e-mail headers, as previously stated. To further elaborate, the following is a Sample e-mail header:

From-Thu April 22 16:38:02 1999
  Received: from netmail2.city.xyz.com (netmail2.city.xyz.com [9.53.250.97]) by alpha.xyz-.com (AIX4.3/UCB 8.8.8/8.7) with ESMTP id VAA41674; Tue, 20 Apr. 1999 21:18:30-0530
  Received: from panacea.city.xyz.com (panacea.city.xyz-.com [9.53.149.235]) by netmail2.city.xyz.com (8.8.5/8.8.5) with ESMTP id KAA19580; Tue, 20 Apr. 1999 10:45:54-0500
  Received: from city.xyz.com (localhost.city.xyz.com [127.0.0.1]) by panacea.city.xyz.com (AIX4.3/UCB 8.8.8/8.7-client 1.01) with ESMTP id KAA26868; Tue, 20 Apr. 1999 10:45:54-0500
  Sender: beta@city.xyz.com
  Message-ID: <371CA12F.343947C9@city.xyz.com>
  Date: Tue, 20 Apr. 1999 10:45:51-0500
  From: namebeta<beta@city.xyz.com>
  Organization: xyz
  X-Mailer: Mozilla 4.06[en] (X11; I; AIX 4.3)
  MIME-Version: 1.0
  To: namedelta delta@alpha.xyz.comn
  CC: rsg@city.xyz.com
  Subject: Re: Code review (fwd)
  References: <Pine.A32.3.91.990419185220.32264B-100000@alpha.xyz.com>
  Content-Type:text/plain; charset=us-ascii
  Content-Transfer-Encoding: 7 bit
  Status: RO
  X-Mozilla-Status: 8011
  X-Mozilla-Status2: 00000000
  X-UIDL: 371f6e3600042002

E-mail header parser 205 of BIOS 201 parses e-mail headers such as the above to count e-mail. This includes checking for conventionally structured TCP/IP e-mail headers as shown above, like "From:," "Received:," "To:," etc. If parser 205 finds a predetermined user identification in the To: portion of one of the e-mail headers, then a count is incremented for that user. The count is stored in memory 127 or 129 of computer system 110. In this way, a count of instances of e-mail addressed to the predetermined user is accumulated in computer system memory by BIOS 201 during the booting of the computing system.

Note that the present invention enables obtaining e-mail count for a particular user or a number of users during booting according to a number of alternative embodiments. In one embodiment of the invention, software at the e-mail server end allows the reading of the e-mail count for arbitrary users. Consequently, in this circumstance client BIOS is customizable so that the user can easily configure the BIOS for checking e-mail for the desired user identification's. That is, user identification's are entered into client BIOS by a user and then in a next boot up e-mail count is obtained from the e-mail server for those user identification's and displayed on the screen of the client machine. (Users grant permission to get their e-mail count accessed by the client BIOS in this manner, so that there is no breach in security and privacy.) In another embodiment of the present invention, the client BIOS has a single user identification and password stored within itself and displays e-mail count only on a secure basis by accessing the e-mail server and the mail box of the single user in question. In another embodiment of the present invention, client BIOS accepts a user name and password during boot time and accesses only the e-mail count for that particular user name or password.

Referring again to FIG. 2, limited function display routine 206 displays e-mail count, as previously stated. To further elaborate, in one embodiment of the present invention, display routine 206 displays e-mail information that is obtained from the e-mail server on display device 137 (FIG. 1) in the following format during booting:
No. of e-mail's received today: 124
  In another alternative, e-mail information is displayed in the following format:
No. of urgent e-mail's received today: 40
No. of normal e-mail's received today: 32
  In another alternative, e-mail information is displayed in the following format:
No. of urgent unread e-mail's: 33
No. of normal unread e-mail's: 22
No. of e-mail's with attachments: 3
  It should also be understood that in one embodiment of the invention, the user can redefine the format for displaying the e-mail count and related information.

It should be understood from the foregoing, that the invention is particularly advantageous because it saves precious time to the ordinary user who wants to merely check e-mail count before deciding/planning actions for a particular day. The invention enables the user to see the e-mail count on a personal computing system before an e-mail application of the system is loaded, and even before the complete OS of the system is loaded.

To summarize, according to an embodiment of the present invention The system starts the boot process. The modified BIOS loads and starts TCP/IP, connects with external mail server and obtains e-mail count and displays on the screen the e-mail count. Once the e-mail count is displayed, control is passed back over to BIOS which completes the normal boot up process after terminating the limited version TCP/IP. Control then passes over to the other parts of the BIOS and its normal functionality of booting the operating system is completed. Optionally, the system will wait for the user to give a command to continue booting. Optionally, the system will store the e-mail counts of a large number of users in a pre specified file or memory location, if necessary. This information can be gathered later on as soon as the system boots up fully.

The description of the present embodiment has been presented for purposes of illustration, but is not intended to be exhaustive or to limit the invention to the form disclosed. Many modifications and variations will be apparent to those of ordinary skill in the art. For example, with more and more functionality being introduced into BIOS software, this invention may even pave the way for low cost e-mail count devices that substitute for a personal computing system. But the invention can also be extended to large computing systems. In certain scenarios, this invention would be helpful in advance planning.

Those of ordinary skill in the art will appreciate that the hardware in FIG. 1 may vary depending on the implementation. For example, other peripheral devices, such as optical disk drives and the like, may be used in addition to or in place of the hardware depicted in FIG. 1. The depicted example is not meant to imply architectural limitations with respect to the present invention. For example, the processes of the present invention may be applied to multiprocessor data processing systems.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

Note also that the present invention may be practiced as a method for deploying computing infrastructure, which includes integrating computer-readable code into a computing system, such that the code in combination with the computing system is capable of performing the processes of the present invention.

To reiterate, the embodiments were chosen and described in order to best explain principles of the invention, practical application of the invention, and to enable others of ordinary skill in the art to understand the invention. Other embodiments of the invention having various modifications may be suited to the above described and other uses and may be within the scope of the present invention.

What is claimed is:

1. A computing system comprising:
   a processor;
   memory;
   a display;
   a network adapter for connecting the computing system to a network; and
   a basic input/output system (BIOS) stored in the memory and operable for booting the computing system, wherein the BIOS includes:
   a BIOS network adapter driver for communicating with the network adapter;
   a BIOS communication module for driving the network adapter via the network adapter driver to communicate with a remote e-mail server on the network, wherein the communication with the remote e-mail server includes downloading to the computing system memory, during the booting of the computing system, e-mail headers from the remote e-mail server on the network;
   a BIOS e-mail header parser for identifying a predetermined user address in receiver address portions of the e-mail headers;
   accumulating in the computing system memory, during the booting of the computing system, a count of instances of the identified user address; and
   a BIOS display routine for displaying the accumulated count in a defined format on the display during the booting of the computing system.

2. Amended) The computing system of claim 1, wherein the memory includes a volatile memory and a non-volatile memory and the memory in which the BIOS is stored includes the non-volatile memory, wherein the non-volatile memory includes a protocol module having code for a simple mail transfer protocol, a serial line Internet protocol and a point to point protocol and the BIOS is operable to load a daemon of the protocol module into the volatile memory during booting of the computing system without loading an operating system, so that the daemon is operable to access the network during the booting of the computing system.

3. The computing system of claim 1, wherein the BIOS communication module includes code for a simple mail transfer protocol, a serial line Internet protocol and a point to point protocol.

4. The computing system of claim 3, wherein, in order to reduce the communication module size, the BIOS communication module does not include computer program code for the following:
   a hypertext transfer protocol;
   a file transfer protocol;
   a user datagram protocol;
   an Internet control message protocol;
   an interior gateway protocol;
   an exterior gateway protocol; and
   a border gateway protocol.

5. The computing system of claim 1, wherein the computing system includes a protocol module in the memory, wherein the protocol module has a simple mail transfer protocol, a serial line Internet protocol and a point to point protocol, and wherein the BIOS communication module includes a link to the protocol module for loading the simple mail transfer protocol, serial line Internet protocol and point to point protocol during the booting of the computing system.

6. The computing system of claim 1, wherein the BIOS network adapter driver does not include computer program code for an nslookup function and for a traceroute function.

7. A method for accessing e-mail information by a computing system having a basic input/output system (BIOS) and a network adapter, wherein the network adapter connects the computing system to a network, the method comprising:
communicating with the network adapter by a network adapter driver of the BIOS;
driving the network adapter via the network adapter driver by a communication module of the BIOS, for communicating with a remote e-mail server on the network, wherein the communicating with the remote e-mail server includes downloading to a computing system memory, during the booting of the computing system, e-mail headers from the remote e-mail server on the network;
identifying, by an e-mail header parser of the BIOS, a predetermined user address in receiver address portions of the e-mail headers;
accumulating in the computing system memory, during the booting of the computing system, a count of instances of the identified user address by the BIOS e-mail header parser; and
displaying the accumulated count in a defined format on the display during the booting of the computing system by a display routine of the BIOS.

8. The method of claim 7, wherein the memory includes a volatile memory and a non-volatile memory and the memory in which the BIOS is stored includes the non-volatile memory, wherein the non-volatile memory includes a protocol module having code for a simple mail transfer protocol, a serial line Internet protocol and a point to point protocol and the method includes:
loading a daemon of the protocol module into the volatile memory by the BIOS without loading an operating system; and
accessing the network by the daemon during the booting of the computing system.

9. The method of claim 7, wherein the BIOS communication module drives the network adapter driver with a simple mail transfer protocol, a serial line Internet protocol and a point to point protocol.

10. The method of claim 7, wherein the computing system includes a protocol module in the memory, wherein the protocol module has a simple mail transfer protocol, a serial line Internet protocol and a point to point protocol, and the method includes loading the simple mail transfer protocol, serial line Internet protocol and point to point protocol during the booting of the computing system by the BIOS using a link to the protocol module.

11. A computer program product comprising computer readable program code stored on computer readable storage medium embodied therein for causing a computing system to access an e-mail count during booting of the computing system, said computer program code comprising:
computer program code for communicating with a network adapter by a network adapter driver of a basic input/output system (BIOS), wherein the network adapter connects the computing system to a network;
computer program code for a communication module of the BIOS to drive the network adapter via the network adapter driver for communicating with a remote e-mail server on the network, wherein the communicating with the remote e-mail server includes downloading to a computing system memory, during the booting of the computing system, e-mail headers from the remote e-mail server on the network;
computer program code for an e-mail header parser of the BIOS to identify a predetermined user address in receiver address portions of the e-mail headers and accumulate in the computer computing system memory, during the booting of the computing system, a count of instances of the identified user address; and
computer program code for a display routine of the BIOS to display the accumulated count in a defined format on the display during the booting of the computing system by a display routine of the BIOS.

12. The computer program product of claim 11, wherein the memory includes a volatile memory and a non-volatile memory and the memory in which the BIOS is stored includes the non-volatile memory, wherein the non-volatile memory includes a protocol module having computer program code for a simple mail transfer protocol, a serial line Internet protocol and a point to point protocol and the method includes:
computer program code for loading a daemon of the protocol module into the volatile memory by the BIOS without loading an operating system; and
computer program code for accessing the network by the daemon during the booting of the computing system.

13. The computer program product of claim 11, wherein the BIOS communication module includes computer program code for a simple mail transfer protocol, a serial line Internet protocol and a point to point protocol.

14. The computer program product of claim 13, wherein the BIOS communication module does not include computer program code for the following protocols:
a hypertext transfer protocol;
a file transfer protocol;
a user datagram protocol;
an Internet control message protocol;
an interior gateway protocol;
an exterior gateway protocol; and
a border gateway protocol.

15. The computer program product of claim 11, wherein the computer program code includes a protocol module having a simple mail transfer protocol, a serial line Internet protocol and a point to point protocol, wherein the BIOS communication module includes computer program code for loading the simple mail transfer protocol, serial line Internet protocol and point to point protocol during the booting of the computing system using a link to the protocol module.

16. The computer program product of claim 11, wherein the BIOS network adapter driver does not include computer program code for the following network functions:
a nslookup function: and
a traceroute function.

17. A method for deploying computing infrastructure, comprising integrating computer-readable code into a computing system, wherein the code in combination with the computing system is capable of performing a process of accessing e-mail information by a computing system, the method comprising:
connecting the computing system to a network by a network adapter;
communicating with the network adapter by a network adapter driver of a basic input/output system (BIOS);
driving the network adapter via the network adapter driver by a communication module of the BIOS, for communicating with a remote e-mail server on the network, wherein the communicating with the remote e-mail server includes downloading to a computing system memory, during the booting of the computing system, e-mail headers from the remote e-mail server on the network;

identifying, by an e-mail header parser of the BIOS, a predetermined user address in receiver address portions of the e-mail headers;

accumulating in the computing system memory, during the booting of the computing system, a count of instances of the identified user address by the BIOS e-mail header parser; and displaying the accumulated count in a defined format on the display during the booting of the computing system by a display routine of the BIOS.

18. The method of claim 17, wherein the memory includes a volatile memory and a non-volatile memory and the memory in which the BIOS is stored includes the non-volatile memory, wherein the non-volatile memory includes a protocol module having code for simple mail transfer protocol, a serial line Internet protocol and a point to point protocol and the method includes:

loading a daemon of the protocol module into the volatile memory by the BIOS without loading an operating system; and accessing the network by the daemon during the booting of the computing system.

19. The method of claim 17, wherein the BIOS communication module drives the network adapter driver with a simple mail transfer protocol, a serial line Internet protocol and a point to point protocol.

20. The method of claim 17, wherein the computer system includes a protocol module in the memory, wherein the protocol module has a simple mail transfer protocol, a serial line Internet protocol and a point to point protocol, and the method includes loading the simple mail transfer protocol, serial line Internet protocol and point to point protocol during the booting of the computing system by the BIOS using a link to the protocol module.

* * * * *